July 16, 1940.  K. C. WOOLLEY ET AL  2,208,353
UNION
Filed May 6, 1939
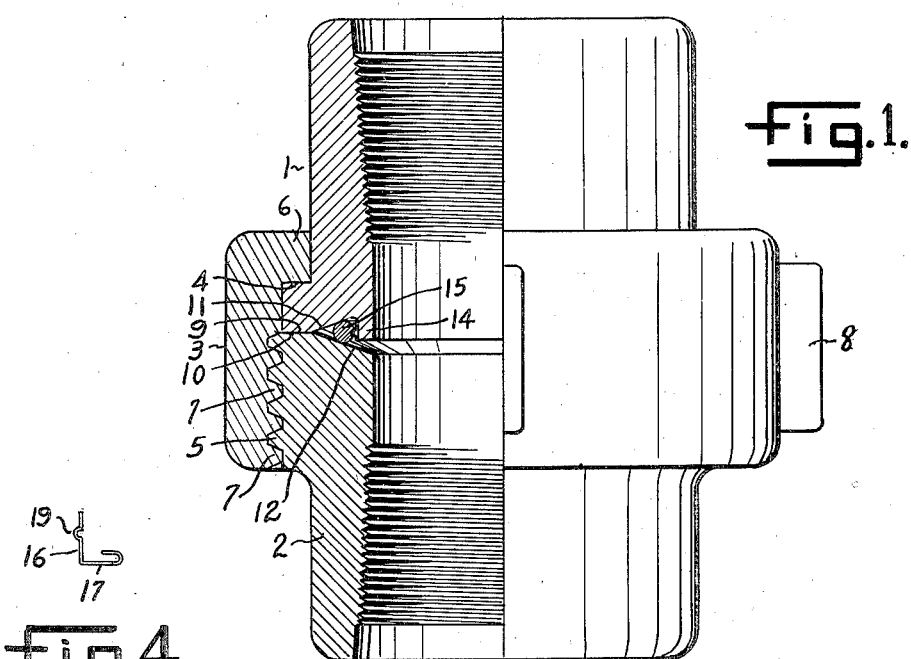
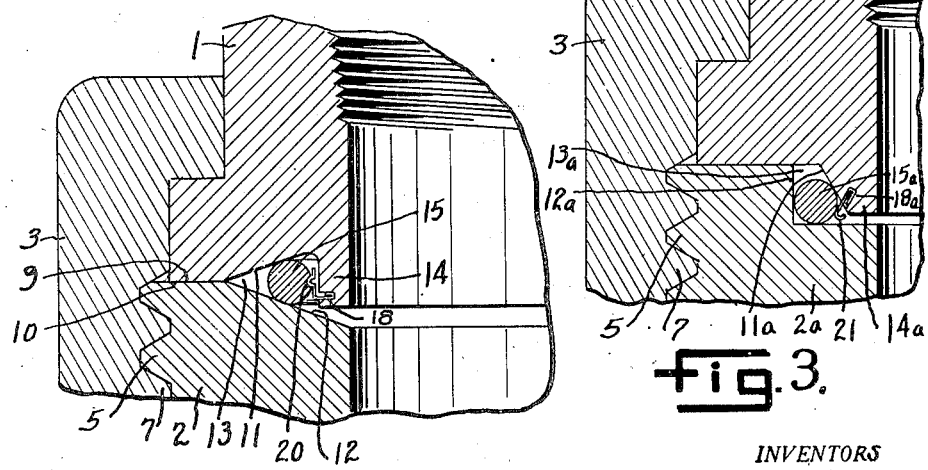
INVENTORS
KENNETH C. WOOLLEY
HOWARD J. HEBERT
BY E. V. Hardway.
ATTORNEY Patented July 16, 1940

2,208,353

UNITED STATES PATENT OFFICE 2,208,353

UNION

Kenneth C. Woolley and Howard J. Hebert, Houston, Tex.

Application May 6, 1939, Serial No. 272,119

2 Claims. (Cl. 285—122)

This invention relates to a coupling.

An object of the invention is to provide a coupling comprising two connected parts with a novel type of sealing means between the parts whereby a fluid tight seal will be maintained between them to prevent the escape of fluid under pressure between the connected parts.

Another object of the invention is to provide a coupling specially designed for connecting parts both of which, or one at least of which, are tubular, said coupling having an outwardly converging, annular seat between the connected parts with an expansible continuous seal ring located in the seat so as to be expanded by the internal pressure of the fluid into sealing engagement with the walls of the seat whereby to prevent the escape of the fluid through the seat, the invention also including means for maintaining the seal ring against detachment or loss when the parts are disconnected.

With the above and other objects in view the invention has particular relation to certain novel features of construction, arrangement of parts and use, examples of which are given in this specification and illustrated in the accompanying drawing, wherein:

Figure 1 shows a side elevation of the coupling, partly in section.

Figure 2 shows an enlarged, fragmentary, sectional view.

Figure 3 shows an enlarged, fragmentary, sectional view of another embodiment, and Figure 4 shows an elevational view of a seal ring retainer employed.

In the drawing the numerals 1 and 2 designate tubular coupling members adapted to be connected by a clamp nut 3. The outer ends of the coupling members may be threaded, as shown, for the connection of pipe sections thereto. The coupling member 1 has the external, annular shoulder 4 therearound and outwardly beyond said shoulder is reduced in external diameter. The coupling member 2 has the external, coarse threads 5 and outwardly beyond said threads is reduced in diameter. The clamp nut 3, at one end has the inwardly extended, annular flange 6 of an inside diameter to fit snugly over the reduced outer end of the coupling member 1 and to engage the shoulder 4 and at its other end has the internal coarse threads 7 adapted to intermesh with the threads 5. Accordingly, when the nut 3 is fitted over the coupling member 1 and screwed onto the threads 5 the adjacent ends of the coupling members 1 and 2 will be drawn together. The nut 3 may have a selected number of external lugs 8 thereon providing impact faces whereby the nut may be tightened up if desired by the use of a hammer or the like, or released. The adjacent ends of the coupling members 1, 2 have the outside plane, annular faces 9, 10 which are drawn closely together when the nut 3 is screwed home. Inside of the annular faces 9, 10, said abutting ends are provided with the inwardly diverging, annular faces 11, 12 forming an annular groove 13 whose walls converge outwardly. The coupling member 1 has an inwardly extended, annular skirt 14 extending partly across said groove toward the adjacent end of the other coupling member 2 and surrounding said skirt and located within the groove 13 there is an annular seal ring 15 which is continuous and which is formed of material allowing the sealing ring to expand, or enlarge in circumference upon the application of inside pressure thereto so as to force the seal ring tightly into contact with the walls 11, 12, and the ring is sufficiently soft to form efficient seals with said walls.

In order to retain the seal ring in place when the parts are separated and to prevent loss thereof retaining means is provided such as illustrated in Figure 4. Two or more retainers should be provided, preferably two located opposite each other. Each retainer is formed with the arms 16, 17 the free end of the latter of which is retracted and seated in an external socket 18 of the skirt 14. The arm 16 is turned to approximately parallel relationship with the outer side of the skirt 14, is formed flexible and is provided with an outwardly directed detent 19 which seats in an inside groove 20 of the seal ring. The seal ring may be fitted around the skirt 14 and passed over the arms 16 and the detent 19 will snap into the groove 20 and thus lock the seal ring in place so that it will not become lost.

In the form shown in Figure 3 the skirt 14a has the external, converging, annular face 11a and the adjacent end of the coupling member 2a is countersunk thus forming an inside, annular face 12a. The faces 11a and 12a converge outwardly to provide an annular groove 13a in which the annular seal ring 15a is located. This seal ring is similar to the seal ring 15 being expansible under internal pressure. It is held in place by one or more flexible retainers 21 whose inner ends are seated in external sockets as 18a in the skirt 14a and whose outer ends project beyond the skirt and are inwardly retracted so as to permit the ring 15a to be slipped over them. They will frictionally engage said ring and hold it against detachment when the coupling members 1a and 2a are separated. In this embodiment also the pressure of the fluid flowing through the coupling will force the seal ring 15a against the converging walls 11a and 12a thus forming fluid tight seals and in both forms of the invention the higher the pressure the more effective will be the sealing action of the seal ring.

The drawing and description are illustrative merely, while the broad principle of the invention will be defined by the appended claims.

What we claim is:

1. A union comprising two tubular coupling members, means for releasably clamping said members together, the adjacent parts of the members having converging faces to form an inside seat, a continuous, expansible seal ring in the seat adapted to be forced into sealing engagement with said faces by the pressure of the fluid in the union and releasable means for retaining the ring in place.

2. A union comprising two tubular coupling members, means for releasably clamping said members together, the adjacent parts of the members having converging faces to form an inside seat, a yieldable seal ring in the seat adapted to be forced into sealing engagement with said faces by the pressure of the fluid in the union and means for releasably connecting the ring to one of the members to prevent detachment of the ring from the member to which it is connected when the clamping means is released.

KENNETH C. WOOLLEY.
HOWARD J. HEBERT.